US012454841B2

(12) United States Patent
Tong et al.

(10) Patent No.: US 12,454,841 B2
(45) Date of Patent: *Oct. 28, 2025

(54) LIGHTED INFLATABLE APPARATUS

(71) Applicant: Polygroup Macau Limited (BVI), Tortola (VG)

(72) Inventors: Ricky Tong, Shenzhen (CN); Scott Hershock, East Dundee, IL (US); Yifeng Zhang, Xinxiang (CN); Chaolong Lan, Shenzhen (CN)

(73) Assignee: Polygroup Macau Limited (BVI), Road Town (VG)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,615

(22) Filed: Feb. 2, 2024

(65) Prior Publication Data

US 2024/0254794 A1 Aug. 1, 2024

Related U.S. Application Data

(63) Continuation of application No. 18/163,726, filed on Feb. 2, 2023, now Pat. No. 11,920,369, which is a continuation of application No. 16/594,824, filed on Oct. 7, 2019, now Pat. No. 11,598,111, which is a continuation of application No. 15/258,449, filed on Sep. 7, 2016, now Pat. No. 10,472,841.

(60) Provisional application No. 62/215,865, filed on Sep. 9, 2015.

(51) Int. Cl.
*E04H 4/14* (2006.01)
*E04H 4/00* (2006.01)

(52) U.S. Cl.
CPC .......... *E04H 4/148* (2013.01); *E04H 4/0025* (2013.01)

(58) Field of Classification Search
CPC .............................. A47K 13/24; E04H 4/0025
USPC ............................................. 4/622, 313, 506
See application file for complete search history.

(56) References Cited

U.S. PATENT DOCUMENTS

| | | | |
|---|---|---|---|
| 4,935,970 A * | 6/1990 | Aristone | E04H 4/0025 D30/129 |
| 6,196,471 B1 | 3/2001 | Ruthenberg | |
| 2003/0019024 A1 | 1/2003 | Thompkins | |
| 2003/0019028 A1* | 1/2003 | Shimizu | G02B 6/001 4/541.5 |
| 2003/0121094 A1* | 7/2003 | Laflamme | A61H 33/02 4/541.1 |
| 2007/0262725 A1 | 11/2007 | Koren | |

(Continued)

FOREIGN PATENT DOCUMENTS

| | | |
|---|---|---|
| CN | 2064797 U | 10/1990 |
| CN | 200965190 Y | 10/2007 |

(Continued)

*Primary Examiner* — Lauren A Crane
(74) *Attorney, Agent, or Firm* — Finnegan, Henderson, Farabow, Garrett & Dunner LLP

(57) ABSTRACT

Aspects of the disclosed technology include a lighted inflatable pool including: a wall including a first inflatable chamber; a base; at least one lighting element disposed within the wall, the at least one lighting element being configured to emit light; and a receiver connected to the at least one lighting element, the receiver being configured to receive a command for controlling the lighting element and to control the at least one lighting element in correspondence with the command.

21 Claims, 4 Drawing Sheets

(56) References Cited

U.S. PATENT DOCUMENTS

| | | | |
|---|---|---|---|
| 2009/0044327 A1* | 2/2009 | Cheng | E04H 4/0025 4/506 |
| 2010/0229296 A1 | 9/2010 | Samuel | |
| 2014/0210373 A1* | 7/2014 | Baret | H05B 47/19 315/294 |
| 2015/0059077 A1 | 3/2015 | Zhu | |
| 2017/0225070 A1* | 8/2017 | Baks | A63F 13/214 |

FOREIGN PATENT DOCUMENTS

| | | |
|---|---|---|
| CN | 202500357 U | 10/2012 |
| CN | 203097349 U | 7/2013 |

\* cited by examiner

LIGHTED INFLATABLE APPARATUS

RELATED APPLICATIONS

This application is a continuation of and claims priority under 35 U.S.C. 120 to U.S. patent application Ser. No. 18/163,726, filed Feb. 2, 2023, which is a continuation of U.S. patent application Ser. No. 16/594,824, filed Oct. 7, 2019, now patented as U.S. Pat. No. 11,598,111, which is a continuation of U.S. Application Ser. No. 15/258,449, which was filed on Sep. 7, 2016, now patented as U.S. Pat. No. 10,472,841, which claims the benefit of U.S.-Provisional Patent Application No. 62/215,865, which was filed on Sep. 9, 2015. The entire contents and substance of each of these applications are hereby incorporated by reference in their entirety as if fully set forth herein.

TECHNICAL FIELD

Aspects of the present disclosure relate to inflatable products having internal lighting, and, more particularly, inflatable products having internal lighting that can change colors.

BACKGROUND

Inflatable products have diverse uses. For example, swimming pools can be a source of fun, relaxation, and enjoyment. In the absence of an independent light source, however, inflatable products may be difficult to enjoy in dark environments. For example, darkness may render use of an inflatable swimming pool dangerous due to poor visibility. Thus, it is desirable to provide an inflatable product with a built-in light source, so that the inflatable product may be used at night. Furthermore, it may be desirable to provide lighting of different colors to enhance the users' enjoyment of the inflatable product.

SUMMARY

Briefly described, and according to one embodiment, aspects of the present disclosure generally relate to a swimming pool having an internal lighting system. Certain embodiments may include an inflatable swimming pool including a wall and a base. The wall may include one or more inflatable chambers. One or more lighting elements may be interior to one or more of the inflatable chambers. The one or more lighting elements may be able to emit a plurality of colors. A color and/or intensity of the lighting elements may be controlled in accordance with a control command.

In some embodiments of the disclosed technology, a lighted inflatable pool includes: a wall including a first inflatable chamber; a base; at least one lighting element disposed within the wall, the at least one lighting element being configured to emit light; and a receiver connected to the at least one lighting element, the receiver being configured to receive a command for controlling the lighting element and to control the at least one lighting element in correspondence with the command.

In further embodiments of the disclosed technology, a lighted inflatable pool includes: a wall; a base including an inflatable chamber; at least one lighting element disposed within the inflatable chamber, the lighting element being configured to emit light; and a receiver connected to the lighting element configured to receive a command for controlling the lighting element and to control the lighting element in correspondence with the command.

In further embodiments of the disclosed technology, a lighted inflatable apparatus includes: an inflatable chamber including a substantially non-porous wall; a lighting element disposed within the inflatable chamber, the lighting element being configured to emit light; and a receiver connected to the lighting element configured to receive a command for controlling the lighting element and to control the lighting element in correspondence with the command.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
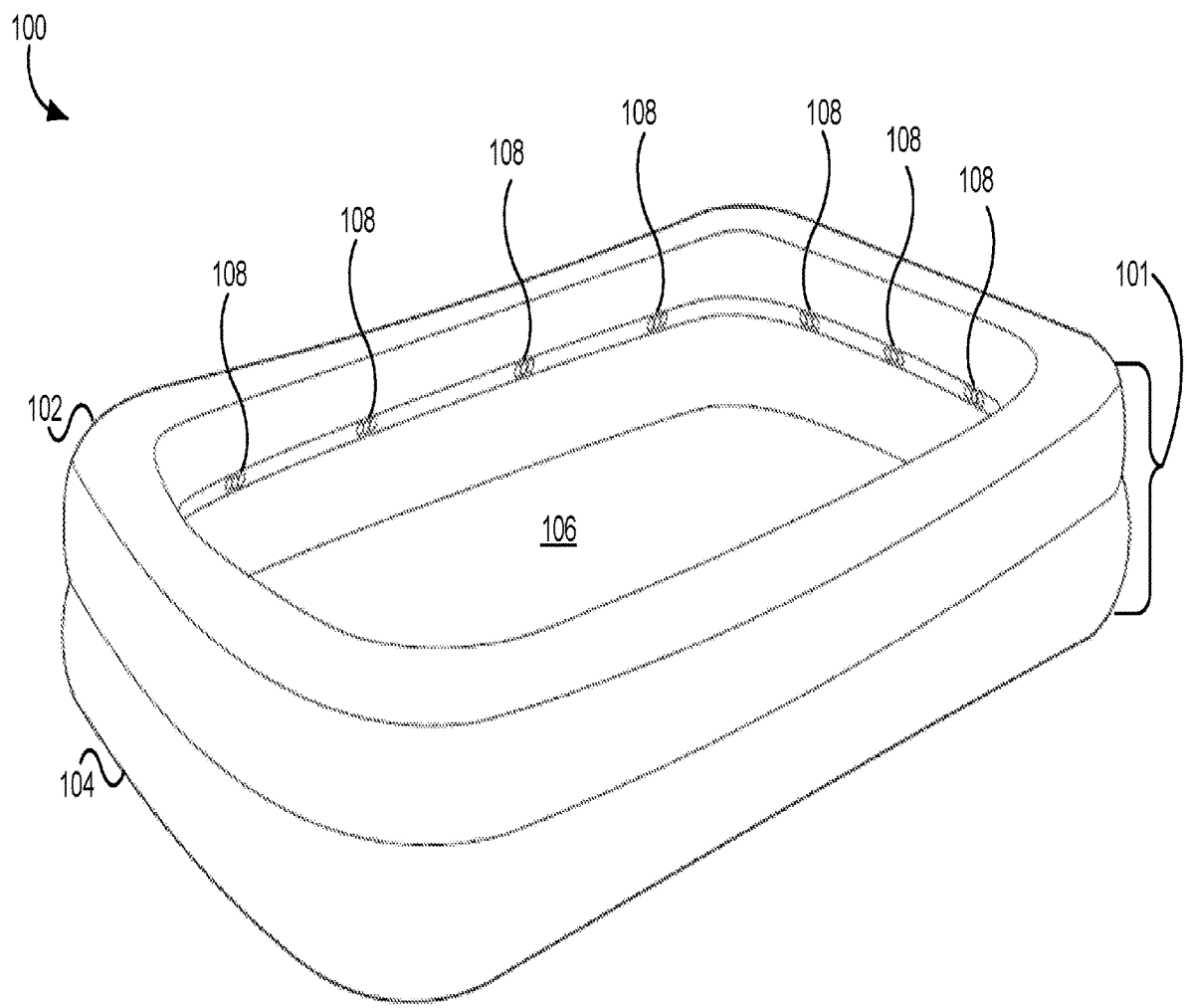
FIG. 1 is a perspective view of a lighted inflatable swimming pool, in accordance with an exemplary embodiment.

The present disclosure can be understood more readily by reference to the following detailed description of one or more exemplary embodiments and the examples included herein. It is to be understood that embodiments are not limited to the exemplary embodiments described within this disclosure. Numerous modifications and variations therein will be apparent to those skilled in the art and remain within the scope of the disclosure. It is also to be understood that the terminology used herein is for describing specific embodiments only and is not intended to be limiting. Some embodiments of the disclosed technology will be described more fully hereinafter with reference to the accompanying drawings. The disclosed technology might, however, be embodied in many different forms and should not be construed as limited to the embodiments set forth herein.

In the following description, numerous specific details are set forth. However, it is to be understood that embodiments of the disclosed technology may be practiced without these specific details. In other instances, well-known methods, structures, and techniques have not been shown in detail in order to avoid obscuring an understanding of this description. References to "one embodiment," "an embodiment," "example embodiment," "some embodiments," "certain embodiments," "various embodiments," etc., indicate that the exemplary embodiment(s) of the disclosed technology so described may include a particular feature, structure, or characteristic, but not that every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicates that different instances of like objects are being referred to, and are not intended to imply that the objects so described must be in a given sequence, either temporally, spatially, in ranking, or in any other manner.

Further, in describing one or more exemplary embodiments, certain terminology will be used for the sake of clarity. It is intended that each term contemplates its broadest meaning as understood by those skilled in the art and includes all technical equivalents that operate in a similar manner to accomplish a similar purpose.

To facilitate an understanding of the principles and features of the embodiments of the present disclosure, exemplary embodiments are explained hereinafter with reference to their implementation in illustrative embodiments. Such illustrative embodiments are not intended to be limiting.

The materials described hereinafter as making up the various elements of the embodiments of the present disclosure are intended to be illustrative only and not restrictive. Many suitable materials that would perform a same or a similar function as the materials described herein are intended to be embraced within the scope of the exemplary embodiments. Such other materials not described herein can include, but are not limited to, materials that are developed after the time of the development of the illustrative embodiments.

Embodiments of the disclosed technology include a lighted inflatable swimming pool for providing increased visibility of an inflatable swimming pool in dark environments. A lighted inflatable swimming pool of the present disclosure can also illuminate water held in the pool. In various embodiments, a lighted inflatable swimming pool may provide different colored lighting to the inflatable swimming pool. In some embodiments, the color of the lighting of the inflatable swimming pool may be controlled by a remote controller.

Throughout this disclosure, certain embodiments are described in exemplary fashion in relation to a lighted inflatable swimming pool. But embodiments of the disclosed technology are not so limited. In some embodiments, the disclosed technology may be effective in other inflatable equipment and toys. As non-limiting examples, certain embodiments may include a lighted inflatable apparatus such as an air mattress, inflatable armband, balloon, sports ball, beach ball, inflatable billboard, inflatable boat, inflatable arch, inflatable castle, inflatable costume, inflatable raft, inner tube, inflatable kayak, inflatable personal flotation device, inflatable tent, and inflatable toy.

Referring now to the drawings, FIG. 1 illustrates a perspective view of a lighted inflatable swimming pool 100 according to some embodiments. In some embodiments, a lighted inflatable swimming pool 100 can include a wall 101 and a base 106. According to some embodiments, the wall 101 can be made up of one or more inflatable chambers. For example, in some embodiments a wall 101 can be made up of an upper chamber 102 and a lower chamber 104. The lighted inflatable swimming pool 100 can further include one or more lighting elements 108. According to some embodiments, lighting elements 108 can be internal to the wall 101. For example, in some embodiments lighting elements 108 can be internal to an upper chamber 102 and/or lower chamber 104 of the wall 101. In some embodiments, lighting elements 108 can be disposed between chambers of the wall 101, for example, between an upper chamber 102 and a lower chamber 104 of the wall 101. According to some embodiments, the wall 101 can be made of a transparent material such that lighting elements 108 can illuminate the lighted inflatable swimming pool 100 when turned on.

As indicated, in some embodiments a wall 101 can comprise one or more inflatable chambers. As an example, much of this disclosure describes a wall 101 having an upper chamber 102 and a lower chamber 104; but it will be understood by those of skill in the art that in various embodiments a wall 101 can be made up of a single chamber, three chambers, or any other number of chambers. Furthermore, descriptions herein of an upper chamber 102 and a lower chamber 104, collectively, can be interchangeable with descriptions of a wall 101. The chambers, such as for example, an upper chamber 102 and lower chamber 104, can be generally hollow and can be configured to inflate upon receiving air pumped into each respective chamber. In some embodiments, the wall 101 and base 106 can be made up of a single inflatable chamber. In some embodiments, any of the chambers described herein can have internal walls that serve to divide a chamber into a series of chambers or sub-chambers.

Furthermore, according to some embodiments, any chamber described herein may contain one or more rigid internal members. Such internal rigid members can provide structure to the chamber. For example, a rigid member can be attached generally perpendicularly to two or more opposing internal surfaces of a chamber to separate the internal surfaces and prevent them from touching. According to some embodiments, such rigid internal members can provide a more sturdy structure to an inflatable chamber, which can be beneficial for inflatable pools that can be subjected to significant rough play.

According to some embodiments, when inflated, one or more chambers of wall 101, such as the upper chamber 102 and lower chamber 104, can be generally cylindrical. Each of the upper chamber 102 and lower chamber 104 can form a closed loop such that no air internal to a chamber can exit the chamber, except through a valve. In some embodiments, as shown in FIG. 1, the upper chamber 102 can be attached atop lower chamber 104. As previously described, a wall 101 can be made up of any number of chambers that can be generally stacked on top of one another.

In some embodiments, a wall 101 can have multiple inflatable chambers and each chamber can be inflated separately from one another. For example, in some embodiments, an upper chamber 102 and a lower chamber 104 can be inflated independently from one another. Alternatively, according to some embodiments, an upper chamber 102 and a lower chamber 104 may be in communication with one another by virtue of an aperture in the bottom of the upper chamber 102 and the top of the lower chamber 104, such that air may flow between the upper chamber 102 and lower chamber 104. In such embodiments, the upper chamber 102 and lower chamber 104 can be inflated simultaneously. In some embodiments, a lighted inflatable swimming pool 100 can have one or more valves to allow air or gas to inflate or deflate the lighted inflatable swimming pool 100.

As previously described, according to some embodiments an upper chamber 102 and lower chamber 104 can form a generally vertical wall 101 of the inflatable pool 100. In some embodiments, the base 106 can be attached to a bottom portion of the wall IOI to form the base of the inflatable pool 100. In some embodiments, the base 106 can be attached to a bottom portion of the lower chamber 104 to form the base of the inflatable pool 100.

According to some embodiments, the wall 101, including upper chamber 102 and lower chamber 104, and base 106 can be made out of plastic, PVC, vinyl, and any type of watertight liner. According to some embodiments, a lighted inflatable swimming pool can be made from a material that does not stretch when the swimming pool 100 is inflated. Accordingly, a swimming pool 100 can have a substantially consistent shape and volume when substantially inflated, regardless of the internal air pressure. In some embodiments, the upper chamber 102, the lower chamber 104, and the base 106 can be attached to one another in a manner that can provide a seal to prevent any liquid from leaking out of the pool. For example, the upper chamber 102, lower chamber 104, and based 106 can be welded together. As will be understood by those of skill in the art, when a lighted inflatable swimming pool 100 is inflated, it will be configured to contain fluids or materials within the boundaries formed by the wall 101 and the base 106.

Figure 2:
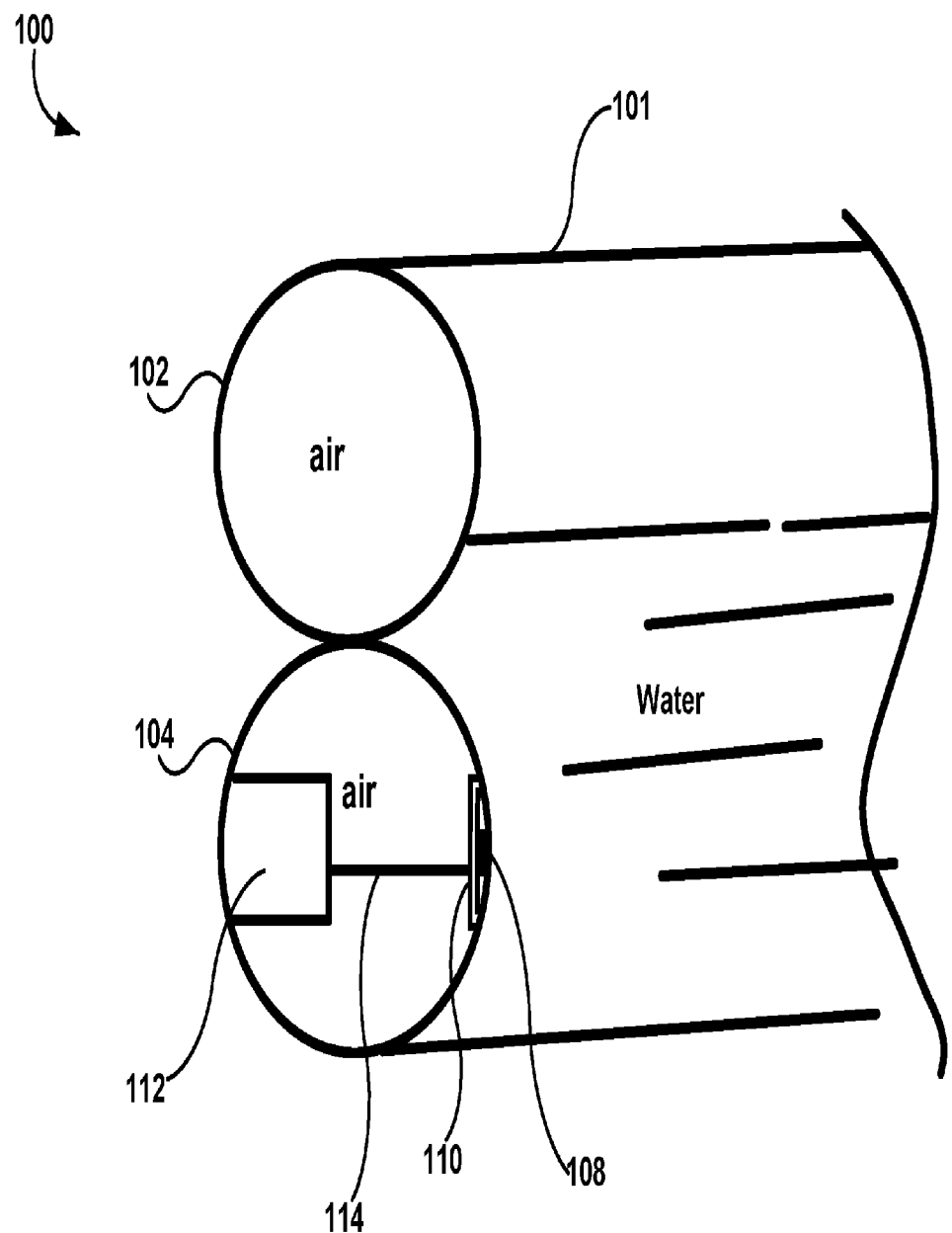
FIG. 2 is a cross-sectional view of a lighted inflatable swimming pool, in accordance with an exemplary embodiment.

FIG. 2 illustrates a cross-sectional view of a lighted inflatable swimming pool 100. According to the embodiment shown in FIG. 2, a wall 101 comprises an upper chamber 102 and a lower chamber 104. According to some embodiments, a bottom portion of the upper chamber 102 can be attached to a top portion of the lower chamber 104. Accordingly, when inflated, the upper chamber 102 and lower chamber 104 can form two generally cylindrical forms positioned one on top of the other.

According to some embodiments, one or more lighting elements 108 can be disposed within the wall 101. Additionally or alternatively, one or more lighting elements 108 can be attached to a surface of wall IOI such as, for example, an inner surface of wall 101. As shown in FIG. 2, lighting elements 108 can be attached to an inner surface of the lower chamber 104. A wall 101, upper chamber 102 and/or lower chamber 104 can be made out of a clear or transparent material to allow light emanating from one or more lighting elements to pass through the surface of the wall 101 and illuminate the lighted inflatable swimming pool 100 and its contents.

In some embodiments, lighting elements 108, attachment member 110, receiver 112, and wiring 114 can be housed in the wall 101. For example, in some embodiments, the upper chamber 102 or the lower chamber 104 can house one or more of lighting elements 108, an attachment member 110, a receiver 112, and wiring 114. According to some embodiments, a receiver 112 can be positioned externally to the wall 101. For example, in some embodiments, an outer surface of an upper chamber 102 or lower chamber 104 can include a pouch to hold a receiver 112. In some embodiments, if a receiver 112 is positioned externally to the upper chamber 102 and lower chamber 104, a chamber wall adjacent to the receiver 112 can have apertures to allow wiring 114 to pass from the receiver 112 into the internal space of the chamber. According to some embodiments, such apertures can be sealed around the wiring 114 to create an airtight space within the chamber.

According to some embodiments, lighting elements 108 can be any electrically activated light source. For example, a lighting element can be an incandescent light bulb or an LED. In some embodiments, a lighting element 108 can be capable of changing colors based on a control signal. For example, a lighting element can be an RGB LED. In some embodiments, lighting elements 108 can be assembled in groups. For example, according to some embodiments, lighting elements 108 can be one or more light strips.

In some embodiments, a light strip can have a flexible printed component board (PCB). According to some embodiments, lighting elements 108 can be bonded onto a flexible PCB. In some embodiments, a PCB can be rigid to accommodate and support the lighting elements 108. In some embodiments, a PCB can be made of a flexible material to accommodate any bending or folding of the lighted inflatable swimming pool 100 when it is packed up for storage.

According to some embodiments, a lighted inflatable swimming pool 100 can have one or more groups of lighting elements 108, such as a series of light strips or light strings. For example, in some embodiments, a group of lighting elements 108, such as a light strip, can be a series of three LEDs in a row, as shown by the lighting elements 108 in FIG. 1. In some embodiments, one or more groups of lighting elements 108 can be connected to one another in parallel or in series. As will be understood by those of skill in the art, an RGB LED light strip can be made up of a red LED, a green LED, and a blue LED, each of which can be selectively turned off and on or varied in brightness by a controller, such as a microcontroller, to create an array of different colors. In some embodiments, an RGB LED can also use red, green, and blue LED chips to combine colors. For example, if both the red LED (or chip) and blue LED (or chip) are activated, the colors can combine and the RGB LED can emit a color that is substantially magenta. In some embodiments, lighting elements 108 can have a working voltage of 12 volts DC.

According to some embodiments, one or more lighting elements 108 can be attached to an inner surface of the wall 101 by an attachment member 110. An attachment member 110 can be any device or manner of attaching or securing one or more lighting elements 108 to a surface of the wall 101. For example, an attachment member can include, but not be limited to, a filmstrip, an adhesive filmstrip, an adhesive material, a welding, a staple, glue, a magnet, hook-and-loop fasteners, or any other method of attaching a lighting element 108 to a wall 101. In some embodiments, a portion of the attachment member can be attached to a surface of the wall 101 in such a manner that tension is created to press the lighting elements 108 against the surface of the wall 101. According to some embodiments, an attachment member can be attached to the inner surface of a wall 101, for example, to the inner surface of a lower chamber 104, to secure one or more lighting elements 108 in place. An attachment member 110 can be, for example, welded, sewn, glued, or otherwise attached to the inner surface of the lower chamber 104 to secure one or more lighting elements 108 in place. According to some embodiments, the attachment member 110 can be detachably attached to the inner wall of the lower chamber 104 to allow for the removal and replacement of lighting elements 108. In some embodiments, one or more lighting elements 108 can be attached to the attachment member such that the one or more lighting elements 108 are held in an interior portion of the lower chamber 104 a distance from the surface of the wall 101. It will be understood by those of skill in the art that a variety of other securing means can be used to secure lighting elements 108 to the inner wall of a chamber.

In some embodiments, one or more lighting elements 108 can be sealed inside the wall 101, for example, in a lower chamber 104, such that the one or more lighting elements are isolated from exposure to fluids placed in the lighted inflatable swimming pool 100. In some embodiments, a plurality of lighting elements 108 can be placed within the lower chamber 104 and can be secured to a portion of an inner surface of the lower chamber 104 that is proximate to the inside of the lighted inflatable swimming pool 100. As noted, according to some embodiments, the surface of the lower chamber 104 can be generally transparent or translucent, such that light emitted by lighting elements 108 can shine through the surface of the lower chamber 104 and illuminate the inside of the lighted inflatable swimming pool 100.

Although lighting elements 108 have generally been described as being housed within the lower chamber 104, it should be understood that this is merely an example. In some embodiments, the lighting elements 108, (and/or one or more of a corresponding attachment member 110, receiver 112, and wiring 114) can be housed in an upper chamber 102 or any other chamber that is part of a wall 101, between chambers of a wall 101, any portion of a wall 101, or internally in any other inflatable item, such as an inflatable base 106. Thus, in some embodiments, upper chamber 102 can have any of the same qualities or characteristics as described herein with respect to lower chamber 104. In some embodiments, the base 106 can have many of the same qualities or characteristics as described herein with respect to lower chamber 104.

Although the lighting elements 108, attachment member 110, receiver 112, and wiring 114 have been discussed with reference to an inflatable pool, it will be understood by one of ordinary skill that incorporation of these elements into other inflatable products is within the scope of the present disclosure. As non-limiting examples, in certain embodiments, one or more of the lighting elements 108, attachment member 110, receiver 112, and wiring 114 may be incorporated into an air mattress, inflatable armband, balloon, sports ball, beach ball, inflatable billboard, inflatable boat, inflatable arch, inflatable castle, inflatable costume, inflatable raft, inner tube, inflatable kayak, inflatable personal flotation device, inflatable tent, and inflatable toy.

Figure 3:
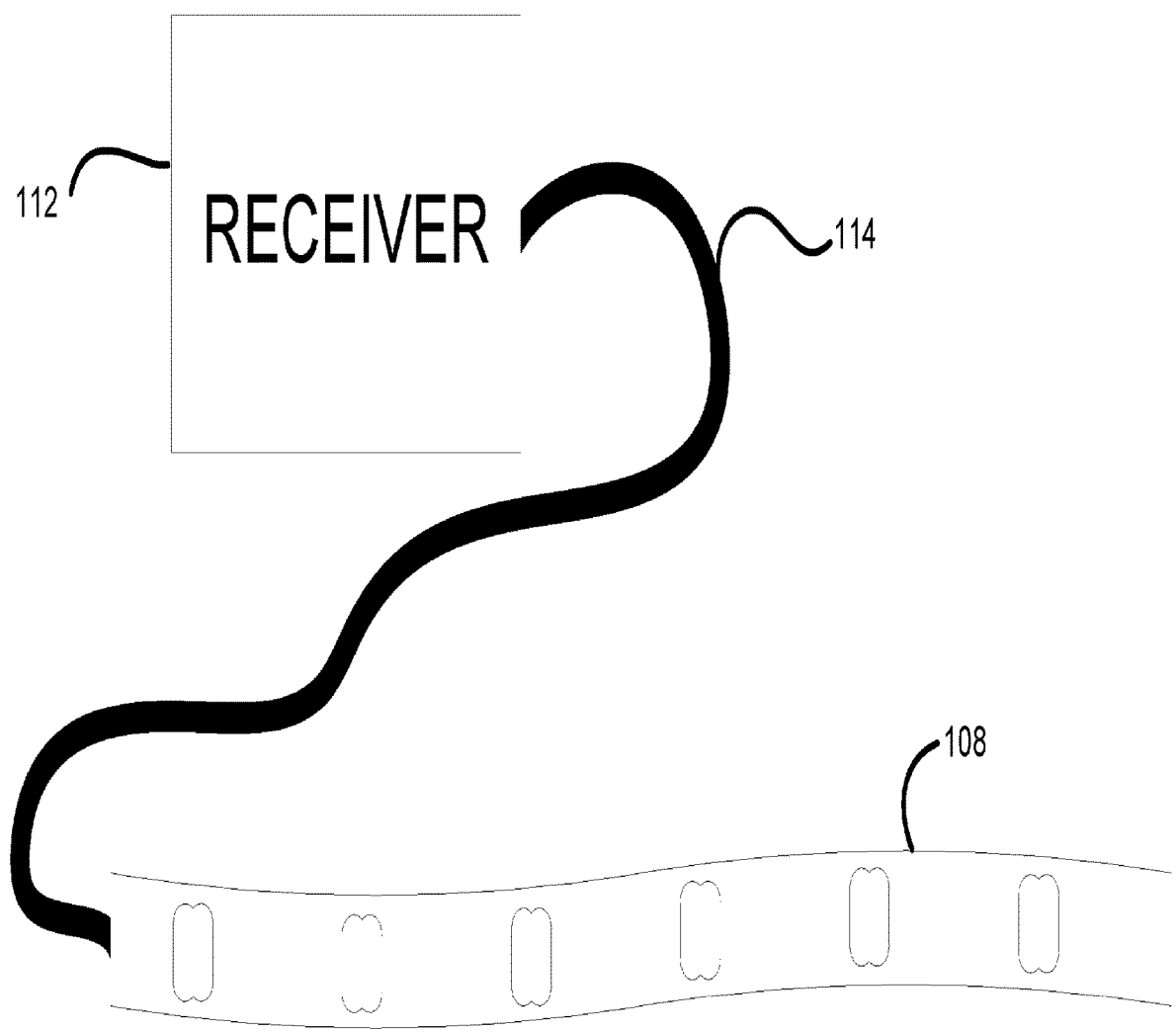
FIG. 3 is a perspective view of a receiver and light strip for use in a lighted inflatable swimming pool, in accordance with an exemplary embodiment.

FIG. 3 illustrates of an exemplary embodiment of a receiver 112 and lighting elements 108 of the present disclosure. According to some embodiments, the receiver 112 can receive control signals that can be used to determine the color of light to be emitted by the lighting elements 108. According to some embodiments, receiver 112 can receive control signals that can be used to determine an on/off state of the lighting elements 108.

According to some embodiments, receiver 112 can contain a power source, such as a battery. According to some embodiments, one or more groups of lighting elements 108 can be powered by a power source of receiver 112. In some embodiments, a power source of receiver 112 can comprise multiple batteries. For example, in some embodiments, a power source of receiver 112 can be made up of eight 1.5-volt DC batteries that can combine to provide 12 volts DC to the lighting elements 108. According to some embodiments, the power source of receiver 112 can be electrically connected to lighting elements 108 by wiring 114. In some embodiments, if more than one group of lighting elements 108 is connected together in series, the wiring 114 from the power source of receiver 112 may only be connected to the first group of lighting elements 108 of the series.

In some embodiments, the wiring 114 can be four conductors, which can include three conductors for controlling the RGB colors and a fourth conductor to control the voltage. For example, one conductor can control the amount of red color generated, one conductor can control the amount of blue color generated, and one conductor can control the amount of green color generated. By varying the degree to which each color is generated, an RGB LED can generate myriad colors from the combinations of different magnitudes of red, green and blue colors generated.

According to some embodiments, a receiver 112 can receive a command signal representative of a color to be generated by a lighting element 108 and can output signals via the wiring 114 to the lighting element 108 configured to cause the lighting element 108 to generate the desired color. According to some embodiments, the receiver 112 can receive a command signal to control individual lighting elements 108 or groups of lighting elements. In some embodiments, the lighted inflatable swimming pool 100 can have a user interface, for example, a keypad connected to the receiver 112, which allows a user to turn the lighting elements 108 off and on, and/or change the color of the light generated by lighting elements 108. According to some embodiments, control signals can be received at receiver 112 from a remote controller (or "remote control") 116.

According to some embodiments, the receiver outputs signals to the lighting element 108. According to some embodiments, the signals may be configured to control the lighting elements 108 according to received command signals. According to some embodiments, the lighting elements 108 may be a plurality of LEDs, and the receiver 112 may include one or more LED drivers. According to some embodiments, the one or more LED drivers may control an intensity and color of the light emitted by the plurality of LEDs through pulse-width modulation of one or more currents supplied to the plurality of LEDs. According to some embodiments, the one or more LED drivers may separately control three currents supplied to by the plurality of LEDs through pulse-width modulation, the three currents corresponding to red LEDs, green LEDs, and blue LEDs, respectively. Although the receiver 112 has been described with reference to one or more LED drivers controlling a plurality of LEDs through pulse-width modulation, one of ordinary skill will recognize that, in various embodiments, alternative elements and methods may be used by the receiver 112 to output signals to control the lighting elements 108.

Figure 4:
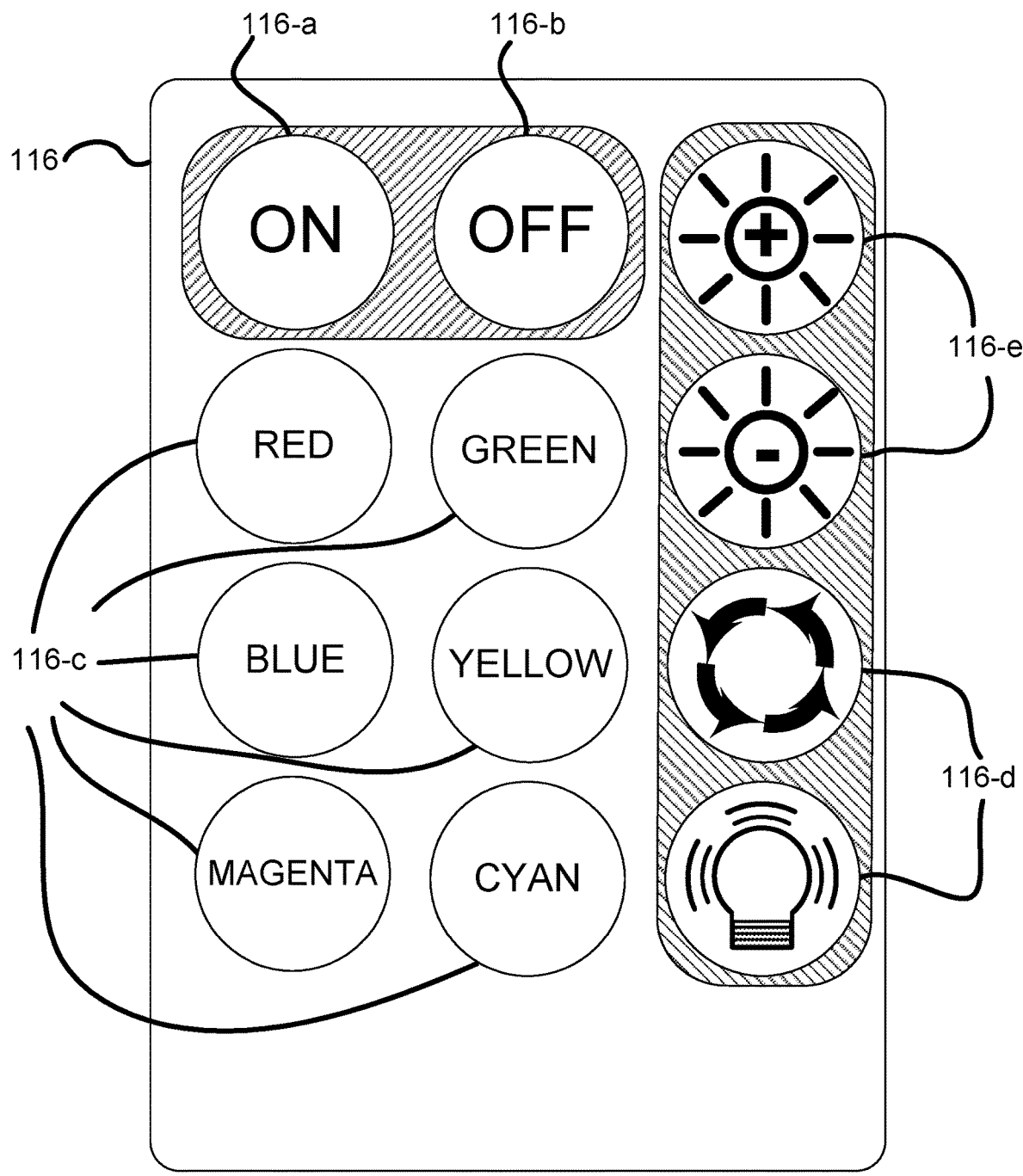
FIG. 4 is a perspective view of a remote controller for a lighted inflatable swimming pool, in accordance with an exemplary embodiment.

FIG. 4 illustrates an exemplary embodiment of a remote controller 116 that can send control signals to the receiver 112 to control the color of the lighting elements 108. According to some embodiments, a remote controller 116 can include circuitry and a power source that enables it to send infrared (IR) or radio-frequency (RF) signals to communicate with receiver 112.

As shown in FIG. 4, according to some embodiments, a remote control 116 can have a plurality of user-selectable buttons that allow a user to input a command to the receiver 112. For example, remote control 116 can have an "on" button 116-a for turning the lighting elements 108 on, an "off" button 116-b for turning the lighting elements 108 off, a plurality of color buttons 116-c for changing the color of the lighting elements 108 to a color corresponding to the respective button, buttons for causing the lighting elements 108 to illuminate with various patterns (e.g., buttons 116-d), and buttons for adjusting the brightness of the lighting elements 108 (e.g., buttons 116-e). The color buttons 116-c may be colored corresponding to the color assigned to the respective button. The color buttons 116-c may be labeled with a name of the color assigned to the respective button. The remote control 116 may have a plurality of intensity controls configured to control the lighting elements 108 to adjust an intensity of at least one corresponding color lighting element. For example, the remote control 116 may include three intensity controls for separately controlling an intensity of all red LEDs, all green LEDs, and all blue LEDs, respectively. One of the buttons (e.g., 116-d) may include a "cycle" button to cause the lighting elements 108 to continuously cycle through a pattern of different colors. It will be understood by those of skill in the art that a remote controller 116 can have a number of different configurations, designs, and functionalities.

As a non-limiting example, the remote control 116 may have six color buttons 116-c that correspond to red, green, blue, yellow, magenta, and cyan. When a user selects the blue color button 116-c, the lighting element 108 may emit blue light. Similarly, when a user selects the yellow color button 116-c, the lighting element 108 may emit yellow light. According to some embodiments, water contained within the inflatable swimming pool 100 can take on the color of the lighting elements 108 when lighting elements 108 are turned on. The water may take on the color of the lighting elements 108 if, for example, lighting elements 108 are positioned around all sides of the inflatable swimming pool 100 orientated to face the center of the pool. Additionally, according to some embodiments, the wall 101 (for example, the upper chamber 102 and lower chamber 104) also can generally take on the color emitted by the lighting elements 108, which can create the impression that the entire lighted inflatable swimming pool 100 has a particular color. Additionally, according to some embodiments, the base 106 can generally take on the color emitted by the lighting elements 108.

Although the disclosure herein generally is described with respect to an inflatable swimming pool having a walls made up of two generally cylindrical chambers, it will be understood by those of skill in the art that the disclosed technology is not so limited. Various different inflatable swimming pool designs can be equipped with lighting elements 108, secured by an attachment member 110, and include a receiver 112 with wiring 114 connecting the receiver 112 to the lighting elements 108. Furthermore, according to some embodiments, a receiver 112 lighting elements 108 and wiring 114 can be inserted into a different kind of inflatable structure or inflatable toy to illuminate it in a similar manner to the manner described herein.

While certain exemplary embodiments of the disclosed technology have been described, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to describe certain embodiments of the disclosed technology, including the best mode, and to enable any person skilled in the art to practice embodiments of the disclosed technology, including making and using any devices or systems and performing any incorporated methods. The scope of certain embodiments of the disclosed technology is defined in the claims and their equivalents. The scope of the certain embodiments may include additional examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lighted inflatable pool comprising:
    a base;
    a transparent wall configured to connect to the base and hold water, wherein the transparent wall comprises an inflatable chamber;
    at least one lighting element configured to emit light through the transparent wall, wherein the at least one lighting element is disposed within the inflatable chamber; and
    a receiver, connected to the at least one lighting element, configured to receive from an external controller one or more control signals that determine an on state of the at least one lighting element.

2. The lighted inflatable pool of claim 1, wherein the transparent wall comprises a plastic outer surface.

3. The lighted inflatable pool of claim 1, wherein the external controller has a power source.

4. The lighted inflatable pool of claim 1, wherein the at least one lighting element comprises at least one of:
    a multicolored lighting element, wherein the on state comprises a color and intensity of the multicolored lighting element; or
    a light strip.

5. The lighted inflatable pool of claim 1, wherein the one or more control signals are radio frequency signals.

6. The lighted inflatable pool of claim 1, wherein the one or more signals are infrared signals.

7. A lighted inflatable pool comprising:
    a transparent base;
    a transparent wall configured to connect to the base and hold water, the transparent wall including an inflatable chamber;
    a plurality of discrete lighting elements configured to emit light through the transparent wall, wherein the plurality of discrete lighting elements are disposed within the inflatable chamber;
    a receiver, connected to the plurality of discrete lighting elements, configured to receive from an external controller one or more control signals that determine an on state of the plurality of discrete lighting elements.

8. The lighted inflatable pool of claim 7, wherein the transparent base comprises a plastic inner surface.

9. The lighted inflatable pool of claim 7, wherein the external controller has a power source.

10. The lighted inflatable pool of claim 7, wherein the plurality of discrete lighting elements comprise at least one of:
    at least one multicolored lighting element, wherein the on state comprises a color and intensity of the at least one multicolored lighting element; or
    a light strip.

11. The lighted inflatable pool of claim 7, wherein the one or more control signals are radio frequency signals.

12. The lighted inflatable pool of claim 7, wherein the one or more signals are infrared signals.

13. A lighted inflatable pool comprising:
    a base;
    a wall-configured to connect to the base, so that the wall and the base hold water, the wall including an inflatable chamber;

at least one lighting element configured to emit light through a translucent or transparent surface of the chamber to illuminate the lighted inflatable pool;

a receiver, connected to the at least one lighting element, configured to receive from an external controller one or more control signals that determine an on state of the at least one lighting element.

14. The lighted inflatable pool of claim 13, wherein the receiver is positioned externally to the chamber.

15. The lighted inflatable pool of claim 14, wherein the receiver provides a voltage to the at least one lighting element.

16. The lighted inflatable pool of claim 13, wherein the one or more control signals are radio frequency signals.

17. The lighted inflatable pool of claim 13, wherein the one or more signals are infrared signals.

18. The lighted inflatable pool of claim 13, wherein the chamber further comprises a first chamber and at least one lighting element disposed within a second chamber, the second chamber in fluid communication with the first chamber.

19. The lighted inflatable pool of claim 13, wherein the at least one lighting element comprises at least one of a flexible printed component board configured to accommodate bending and folding, or a rigid printed component board.

20. The lighted inflatable pool of claim 13, wherein the at least one lighting element comprises a light strip, the light strip further comprising a series of LEDs.

21. The lighted inflatable pool of claim 13, wherein the at least one lighting element comprises a series of light strips.

* * * * *